(12) United States Patent
Jow et al.

(10) Patent No.: US 7,442,471 B1
(45) Date of Patent: Oct. 28, 2008

(54) SOLVENT SYSTEMS COMPRISING A MIXTURE OF LACTAMS AND ESTERS FOR NON-AQUEOUS ELECTROLYTES AND NON-AQUEOUS ELECTROLYTE CELLS COMPRISING THE SAME

(75) Inventors: T. Richard Jow, Potomac, MD (US); Shengshui Zhang, Olney, MD (US); Kang Xu, North Potomac, MD (US); Michael S. Ding, Gaithersburg, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 367 days.

(21) Appl. No.: 10/307,537

(22) Filed: Nov. 27, 2002

Related U.S. Application Data (60) Provisional application No. 60/333,142, filed on Nov. 27, 2001.

(51) Int. Cl.
*H01M 6/16* (2006.01)
(52) U.S. Cl. .................. 429/330; 429/332; 429/326; 429/331; 429/339; 252/62.2
(58) Field of Classification Search ............... 429/330, 429/332, 326, 331, 339, 231.8, 231.4, 231.1; 252/62.2
See application file for complete search history.

(56) References Cited

U.S. PATENT DOCUMENTS

| 5,474,862 | A |   | 12/1995 | Okuno et al. ............... 429/197 |
| 5,525,443 | A |   | 6/1996  | Okuno et al. ............... 429/194 |
| 5,529,707 | A | * | 6/1996  | Kejha ....................... 252/62.2 |
| 5,580,684 | A |   | 12/1996 | Yokoyama et al. .......... 429/194 |
| 5,750,284 | A | * | 5/1998  | Pendalwar et al. .......... 429/332 |
| 5,753,389 | A | * | 5/1998  | Gan et al. .................... 429/326 |
| 5,807,645 | A | * | 9/1998  | Takeuchi et al. .......... 429/231.4 |
| 5,863,454 | A |   | 1/1999  | Chen et al. ................. 252/62.2 |
| 5,908,717 | A |   | 6/1999  | Pendalwar et al. .......... 429/331 |
| 6,010,806 | A |   | 1/2000  | Yokoyama et al. .......... 429/330 |
| 6,025,096 | A |   | 2/2000  | Hope ......................... 429/317 |
| 6,096,856 | A |   | 8/2000  | Helmer-Metzmann et al. ......................... 528/374 |
| 6,268,086 | B1 | * | 7/2001 | Honbo et al. ............. 429/231.8 |
| 2004/0029008 | A1 | * | 2/2004 | Winterberg et al. ...... 429/231.1 |

FOREIGN PATENT DOCUMENTS

| KR | 2000-0002445 | * | 1/2000 |
| WO | WO 01/82403 | * | 11/2001 |

OTHER PUBLICATIONS

Plitcha et al., "Low Temperature Electrolyte for Lithium and Lithium-Ion Batteries," Proc. 38$^{th}$ Power Sources Conference, p. 444, Cherry Hill, NJ Jun. 8-11, 1998.
Smart et al., "Improved Low Temperature Performance of Lithium Ion Cells with Low Ethylene Carbonate (EC) Content Electrolytes," Meeting Abstract, The 2001 Joint International Meeting in Electrochemistry, vol. 2001-2, San Francisco, CA, Sep. 2-7, 2001.
Smart et al., "Development of High Conductivity Lithium-Ion Electrolytes for Low Temperature Cell Applications," Proc. 38$^{th}$ Power Sources Conference, p. 452, Cherry Hill, NJ Jun. 8-11, 1998.
D.A. Stevens & J.R. Dahn, "The Mechansims of Lithium and Sodium Insertion in Carbon Materials," J. Electrochem. Soc., 148(8), A803 (2001).
F.M. Gray, in "Polymer Electrolyte Reviews -1", pp. 141-149, Elsevier Applied Science Publishers Ltd., New York, NY, 1987.

* cited by examiner

*Primary Examiner*—Laura S Weiner
(74) *Attorney, Agent, or Firm*—William V. Adams; William Randolph; A. David Spevack (57) ABSTRACT

A non-aqueous electrolyte solution for lithium or a lithium ion cell, which improves lithium ion cell capacity retention and enhances storage life thereof. The non-aqueous solution can be implemented in the context of an electrolyte system that includes a lithium salt dissolved in a solvent formed from a mixture of one or more cyclic esters, and/or one or more chain esters, and at least one lactam based solvent. Such a system is suited for use with electrochemical energy storage devices, which are based on non-aqueous electrolytes, such as high energy density batteries and/or high power electrochemical capacitors. Such an electrochemical storage devices is generally based on non-aqueous electrolytes that include lithium salt dissolved in a solvent system.

5 Claims, 9 Drawing Sheets

SOLVENT SYSTEMS COMPRISING A MIXTURE OF LACTAMS AND ESTERS FOR NON-AQUEOUS ELECTROLYTES AND NON-AQUEOUS ELECTROLYTE CELLS COMPRISING THE SAME

CROSS REFERENCE TO RELATED PROVISIONAL PATENT APPLICATION

This patent application is related to provisional application, "Solvent Systems Comprising a Mixture of Lactams and Esters for Non-Aqueous Electrolytes and Non-Aqueous Electrolyte Cells Comprising the Same," Ser. No. 60/333,142, which was filed on Nov. 27, 2001. This patent application claims the Nov. 27, 2001 filing date of the above referenced provisional patent application, which is incorporated herein by reference.

STATEMENT OF GOVERNMENT INTEREST

The invention described herein may be manufactured and used by or for the United States Government for Governmental purposes without the payment of any royalties.

TECHNICAL FIELD

The present invention is related to electrochemical energy storage devices, which are based on non-aqueous electrolytes, such as high energy density batteries and/or high power electrochemical capacitors. The present invention is also related to electrochemical storage devices, which are based on non-aqueous electrolytes that include lithium salt dissolved in a solvent system The present invention is additionally related to rechargeable lithium and/or lithium ion batteries.

BACKGROUND OF THE INVENTION

High voltage and high energy density rechargeable (or secondary) lithium batteries based on non-aqueous electrolytes are widely utilized in portable devices such as camcorders, notebook computers, and cell phones. This type of battery generally employs as a cathode, lithiated transition metal oxides such as $LiCoO_2$, $LiNiO_2$, $LiMn_2O_4$, and variations of previous oxides with dopants and a varying stoichiometry. Lithium metal, lithium alloys, and carbonaceous materials are candidates for use as anode materials for rechargeable lithium (ion) batteries. Note that as utilized herein, the term "Li batteries" generally can refer to batteries, which utilize a pure Li metal or alloy as an anode. Carbonaceous materials can be chosen over lithium metal and alloys as anode materials in commercial rechargeable batteries. This type of battery is referred to generally as "lithium battery" or "Li-ion battery" because pure lithium is not present in the anode The Li ions can be intercalated into and de-intercalated out of carbon materials during the charging and discharging processes, respectively. The advantageous of carbonaceous anodes is that they do not possess problems associated with lithium dendrite growth on the anode, which often causes shorting of the cell.

Non-aqueous electrolytes utilized in state-of-the-art lithium-ion batteries can be formed in the context of a mixed solvent system that generally includes cyclic ester compounds, such as, for example, ethylene carbonate (EC), propylene carbonate (PC), butylenes carbonate (BC), and γ-butyrolactone (i.e., gamma-butyrolactone), chain esters such as dimethyl carbonate (DMC), diethyl carbonate (DEC), ethyl methyl carbonate (EMC), ethyl formate, methyl formate, ethyl acetate, methyl acetate, ethyl butyrate, and methyl butyrate. Such a solvent system can contain more than one cycle ester and more than one chain ester. Cyclic esters are chemically and physically stable and possess a high dielectric constant, which is generally required for their ability to dissolve salts. The chain esters are also chemically and physically stable and possess a low dielectric constant and low viscosity, which is needed to increase the mobility of lithium ions in the electrolytes. The electrolyte solute utilized can be a lithium salt, such as, for example, lithium hexafluorophosphate ($LiPF_6$), lithium imide ($LiN(SO_2CF_3)_2$), lithium trifluoromethanesulfonate ($LiCF_3SO_3$), lithium hexafluoroarsenate ($LiAsF_6$), lithium tetrafluoroborate ($LiBF_4$), and lithium bis(oxalato) borate (LiBOB). The preferred salt for the state-of-the-art Li-ion batteries is $LiPF_6$.

To improve low temperature performance, a ternary or quaternary solvent mixture containing cyclic carbonate with a high linear carbonate content can be utilized, as reported by Smart et al and Plichta et al. Refer to Smart et al., "Improved Low Temperature Performance of Lithium Ion Cells with Low Ethylene Carbonate (EC) Content Electrolytes," Meeting Abstract, 20001 Joint International Meeting in Electrochemistry, Vol. 2001-2, San Francisco, Calif., 2-7 Sep. 2001, which is incorporated herein by reference. Additionally, refer to Plichta et al., "Low Temperature Electrolyte for Lithium and Lithium Ion Batteries," Proc. 38th Power Sources Conference, pg 444, Cherry Hill, N.J., 8-11, June 1998, which is also incorporated herein by reference This approach is based on a low melting point and a low viscosity of the linear carbonates. Utilizing this same approach, solvents of low viscosity such as methyl acetate and methyl butyrate can also be added to improve low temperature performance.

Additionally, aliphatic carboxylate, such as methyl propionate and ethyl propionate can also be utilized to improve a low temperature performance For example, U.S. Pat. No. 5,474,862, "Nonaqueous Electrolyte Secondary Batteries," which issued to Okuno et al on Dec. 12, 1995, and U.S. Pat. No. 5,525,443, "Non-Aqueous Secondary Electrochemical Battery", which issued to Okuno et al on Jun. 11, 1996, indicate that methyl propionate and ethyl propionate can also be utilized to improve a low temperature performance. U.S. Pat. No. 5,474,862 and U.S. Pat. No. 5,525,443 are incorporated herein by reference. Disadvantages of such solvents include their high vapor pressure at elevated temperatures and their low dielectric constant, which restricts the ability of the solvents to dissociate salt. Li and Li-ion cells with such electrolytes typically will encounter large internal pressure when operated at elevated temperatures and under high rate discharge conditions. The lower temperature performance is not necessarily optimized utilizing electrolytes of this nature because the lithium transport number is likely to be low.

Batteries with solid-state electrolytes including polymer electrolytes are safer because they experience less pressure build-up through solvent vapor at elevated temperatures. Their poor conductivities, however, limit their application to a high temperature end. To improve solid-state polymer electrolytes for higher performance, a gel electrolyte, or a homogeneous hybrid film of polymer, salt, and plasticizers, which function as a low molecular weight polar solvent, have been utilized. For example, such a configuration is described by F. M Gray, "Polymer Electrolyte Reviews—1," pp. 141-149, Elsevier Applied Science Publishers Ltd., New York, N.Y. 1987, which is incorporated herein by reference. Polar plasticizers include propylene carbonate (PC), ethylene carbonate (EC), γ-butyrolactone (γBL), 1-methyl-2pyrrolidinone (NMP), and dimethylsulfoxide (DMSO).

To further improve the conductivity of the gel electrolyte, solvents with low dielectric constants and low viscosities, such as diethyl carbonate (DEC) have been utilized as a major component (e.g., over 70%). Such a solvent is described in, for example, U.S. Pat. No. 5,908,717, "Electrolyte Composition for Rechargeable Electrochemical Cells," which issued to Pendalwar et al on Jun. 1, 1999. U.S. Pat. No. 5,908,717 is incorporated herein by reference. U.S. Pat. No. 5,908,717 discloses an electrochemical cell that includes first and second electrodes and an electrolyte system disposed therebetween. The electrolyte system includes a polymeric support structure through which is dispersed an electrolyte active species in an organic solvent. The solvent, which remains liquid to low temperatures, is a binary or higher order system comprising diethyl carbonate and one or more of propylene carbonate, ethylene carbonate, dimethyl carbonate, dipropylcarbonate, dimethylsulfoxide, acetonitrile, dimethoxyethane, tetrahydrofuran, n-methyl-2-pyrrolidone, and combinations thereof.

Among the lactam compounds, NMP can also be utilized as a complexing agent or a plasticising agent for fabricating solid-state polymeric and gel polymeric electrolytes utilizing a specific salt, such as alkali metal triflate (or trifluoromethanesulfonate) salt. Such a use of NMP is described in U.S. Pat. No. 6,025,096, "Solid State Polymeric Electrolyte for Electrochemical Devices," which issued to Stephen F. Hope on Feb. 15, 2000, and is incorporated herein by reference. U.S. Pat. No. 6,025,096 discloses a solid state polymeric electrolyte, which is formed by complexing an alkaline metal triflate salt and polyethylene oxide with an ester and an ether or a pyrrolidinone and an ether, or two ethers of different boiling points as co-solvents to form a solid or semi-solid state electrolyte.

NMP is commonly utilized as a solvent for dissolving polyvinylidene fluoride binder. Mixing the binder solution with active electrode material, such as lithiated transition metal oxides for positive electrode or carbonaceous materials for negative electrode and conductive diluents, can form a slurry thereof. Such a slurry can then be coated on a metal substrate and the NMP removed later by heating under reduced pressure. Such a method is commonly utilized in lithium battery industrial processes for fabricating coated electrodes on current collectors An example of such a method is described by DA. Stevens and J. R. Dahn, "The Mechanisms of Lithium and Sodium Insertion in Carbon Materials," J. Electrochem. Soc, 148(8), A803 (2001), which is incorporated herein by reference NMP can also be utilized as a solvent of choice for the preparation of electro conductive polymer composite electrodes for use in secondary batteries as a positive electrode. An electro conductive polymer such as polyaniline and the polymer electrolyte, which can be composed of, for example, $LiClO_4$ and polyvinyl alcohol or polyalkylene oxide, can be dissolved in NMP to form a solution thereof The resulting solution can then be cast on a current collector and the solvent later removed and a film electrode formed thereof. Such a technique is described in U.S. Pat. No. 5,863,454, "Electroconductive Polymer Composites for Use in Secondary Batteries as Positive Electrode Materials," which issued on Jan. 26, 1999 to Chen et al, and which is incorporated herein by reference.

Other lactams utilized in industry include 1-methyl-piperidone and 1-methyl caprolactam, which are important monomers for synthetic fabrics. Lactams or solvents based on lactam structures are not utilized in liquid based electrolytes for Li-ion batteries.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

It is therefore one aspect of the present invention to provide an improved nonaqueous electrolyte system that includes a lithium salt dissolved in a solvent mixture formed from a lactam-based solvent, one or more cyclic esters, and/or one or more chain esters.

It is another aspect of the present invention to provide an improved electrolyte system, which is physically, chemically and electrochemically stable with respect to anode, cathode and separator materials utilized in lithium and lithium ion cells, and which can maintain such stability over a wide temperature range.

It is still another aspect of the present invention to provide a nonaqueous electrolyte system that includes a lithium salt such as $LiPF_6$ or $LiBF_4$ salt dissolved in a solvent system, which includes a lactam-based solvent, one or more cyclic esters and one or more chain esters having properties as described above.

It is yet a further aspect of the present invention to provide a lithium or lithium ion battery system employing the aforementioned non-aqueous electrolyte system, which is stable, possesses excellent capacity, capacity retention, and which is safe at elevated temperatures.

The above and other aspects can be achieved as is now described. The present invention describes a non-aqueous system for a lithium or lithium ion battery, which is based on a lithium metal, lithium-alloy or a carbonaceous material utilized as an anode. Such a non-aqueous system also utilizes a lithiated complex metal oxide as a cathode. The present invention also discloses a non-aqueous electrolyte solution, which can improve the capacity of a lithium ion cell while enhancing storage life thereof. The electrolyte system of the present invention can include a lithium salt dissolved in a solvent system formed from a mixture of one or more cyclic esters, and one or more chain esters, and/or a lactam-based solvent of the general chemical structure provided below:

wherein n ranges between 2 and 7, the variable X represents $C_mH_{2m+1}$ ($m \geq 1$), and $R^1$ and $R^2$ can be identical or different and represent $C_mH_{2m+1}$ ($m \geq 0$), respectively. The cyclic ester utilized herein can be selected from a group that includes ethylene carbonate, propylene carbonate, butylenes carbonate, and γ-butyrolactone The chain ester described can be selected from a group that includes diethyl carbonate, dimethyl carbonate, ethyl methyl carbonate, ethyl formate, methyl formate, ethyl acetate, methyl acetate, ethyl butyrate, and methyl butyrate. The lactam described herein can be typically represented by, but not limited to 1-methyl propiolactam (n=2, X=methyl, $R^1$ and $R^2$=H), 1-methyl pyrrolidinone (n=3, X=methyl, $R^1$ and $R^2$=H), 1-methyl piperidone (n=4, X=methyl, $R^1$ and $R^2$=H), 1-methyl caprrolactam (n=5, X=methyl, $R^1$ and $R^2$=H), and 1-methyl azacyclononanone (n=5, X=methyl, $R^1$ and $R^2$=H).

Thus, lithium batteries and lithium ion batteries, which utilize the electrolytes of the present invention can realize the benefits of improved capacity utilization, high capacity retention, and a long storage life in a wide temperature range.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

The present invention described herein can provide non-aqueous electrolyte solution for lithium or lithium ion cell, which enhances lithium ion cell capacity retention and improves storage life thereof. The electrolyte system described herein comprises a lithium salt dissolved in a solvent system that is formed from a mixture of one or more cyclic esters, and/or one or more chain esters, and/or a lactam-based solvent of the general structure below:

wherein n ranges between 2 and 7, the variable X represents $C_mH_{2m+1}$ (m≧1), and $R^1$ and $R^2$ can be identical or different and represent $C_mH_{2m+1}$ (m≧0), respectively. The preferred lactam structure can possess a value for variable n between 3 and 5. The cyclic ester can be selected from the group consisting of ethylene carbonate, propylene carbonate, butylenes carbonate, and γ-butyrolactone. The chain ester can be selected from the group consisting of diethyl carbonate, dimethyl carbonate, ethyl methyl carbonate, ethyl formate, methyl formate, ethyl acetate, methyl acetate, ethyl butyrate, and methyl butyrate. The lactam is typically represented by, but not limited to, 1-methyl propiolactam (n=2, X=methyl, $R^1$ and $R^2$=H), 1-methylpyrrolidinone (n=3, X=methyl, $R^1$ and $R^2$=H), 1-methyl piperidone (n=4, X=methyl, $R^1$ and $R^2$=H), 1-methyl caprrolactam (n=5, X=methyl, $R^1$ and $R^2$=H), and 1-methyl azacyclononanone (n=6, X=methyl, $R^1$ and $R^2$=H). The lithium salt can be selected from a group of $LiPF_6$, $LiBF_4$, $LiAsF_6$, $LiClO_4$, $LiSO_3CF_3$, $LiN(CF_3SO_2)_2$, $LiN(C_2F_5SO_2)_2$, $LiB(C_2O_4)_2$, and $LiPF_3(C_2F_5)_3$. The preferred lithium salt is $LiPF_6$ or $LiBF_4$. The content of lactam solvent of general formula I with a weight ratio ranging between 2% to 90% in the total solvent system is preferred.

The benefit of the present invention will be evident from the examples illustrated below, which are presented herein for illustrative purposes only.

EXAMPLE I

Handling of the dried solvents, the lithium salts and the electrolyte solutions were carried out in argon-filled glove boxes, where the relative humidity was below 5 ppm and oxygen levels below 10 ppm were maintained. Ethylene carbonate and ethylmethyl carbonate (electrolyte grade) were mixed according to certain ratios and then subjected to a Karl-Fischer titration. The moisture content was below 10 ppm in all cases. N-methylpyrrolidinone (NMP) was added according to different desired weight percentages, in a range between 2% up to 90%. After thoroughly mixing, 1.0 modality of $LiPF_6$ or $LiBF_4$ was added into the solvent mixture. The solution was shaken occasionally to accelerate the salt dissolution. Two electrolyte compositions of 1 m $LiPF_6$ in EC:N-MP:EMC (3:3:4 wt) and in EC:NMP:EMC (1:1:3 wt.) were used for illustrative purposes. The stability of the electrolyte solutions was then subject to various tests to demonstrate its advantage for use with an Li-ion battery.

EXAMPLE 2

Figure 1:
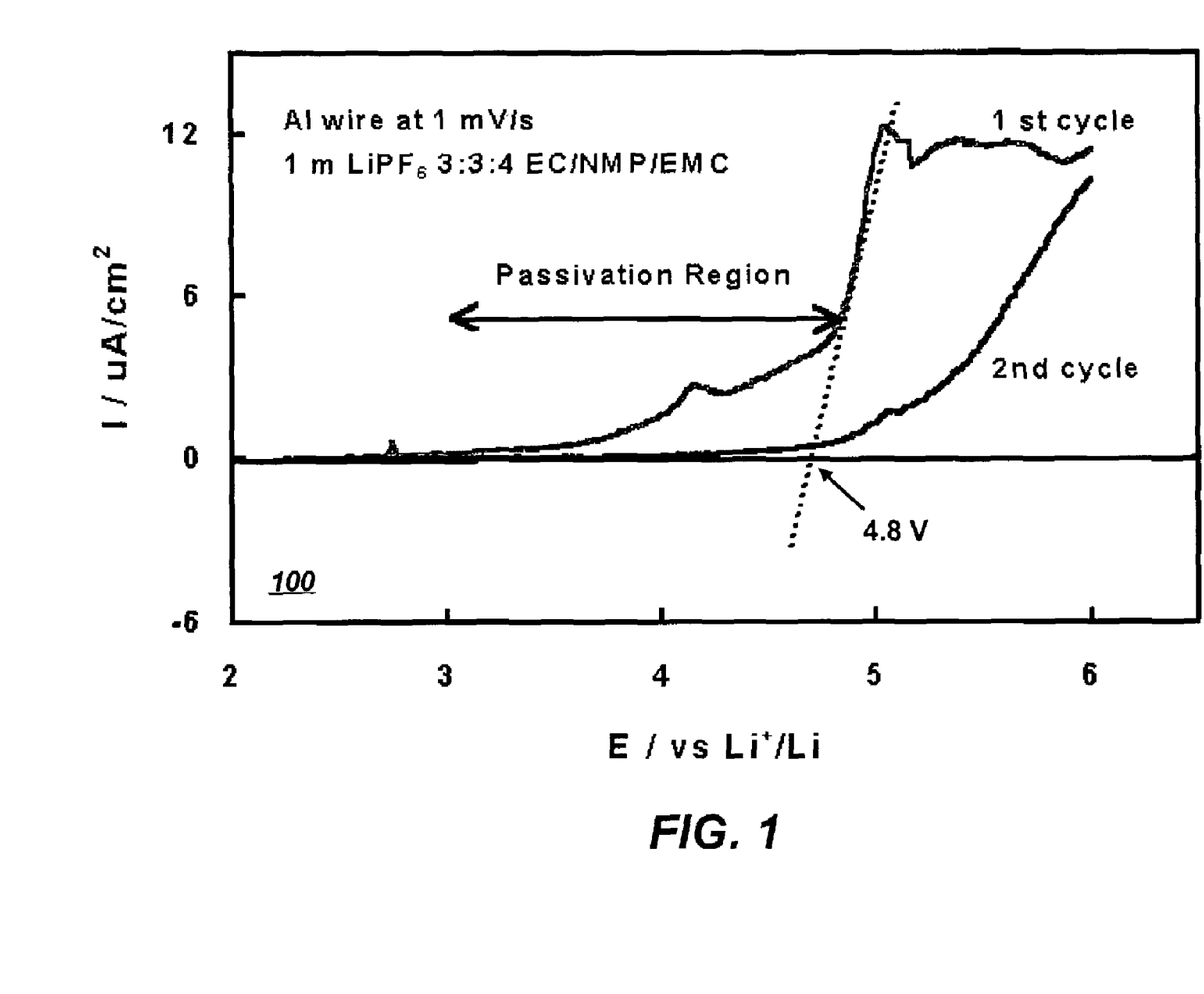
FIG. 1 depicts a graph indicating the passivation of an Al current collector in an electrolyte system that includes solvents of the present invention in accordance with a preferred embodiment of the present invention.

Linear sweep voltammetry was used to determine the stability of Al in the electrolytes of Example 1. FIG. 1 depicts a graph too indicating the corrosion current as a function of voltage of an Al current collector in an electrolyte system that includes solvents of the present invention in accordance with a preferred embodiment of the present invention. As depicted in FIG. 1, Al can be passivated in the potential range above 4.0 V (vs. Li/Li$^+$) in the electrolyte of 1 m in LiPF6 in EC NMP EMC (3:3:4), and the anodic dissolution of Al is effectively suppressed in subsequent scans. Stabilization of Al ensures that the electrolytes formulated in this invention will withstand high charging voltages in Li and Li-ion cells.

EXAMPLE 3

Figure 2:
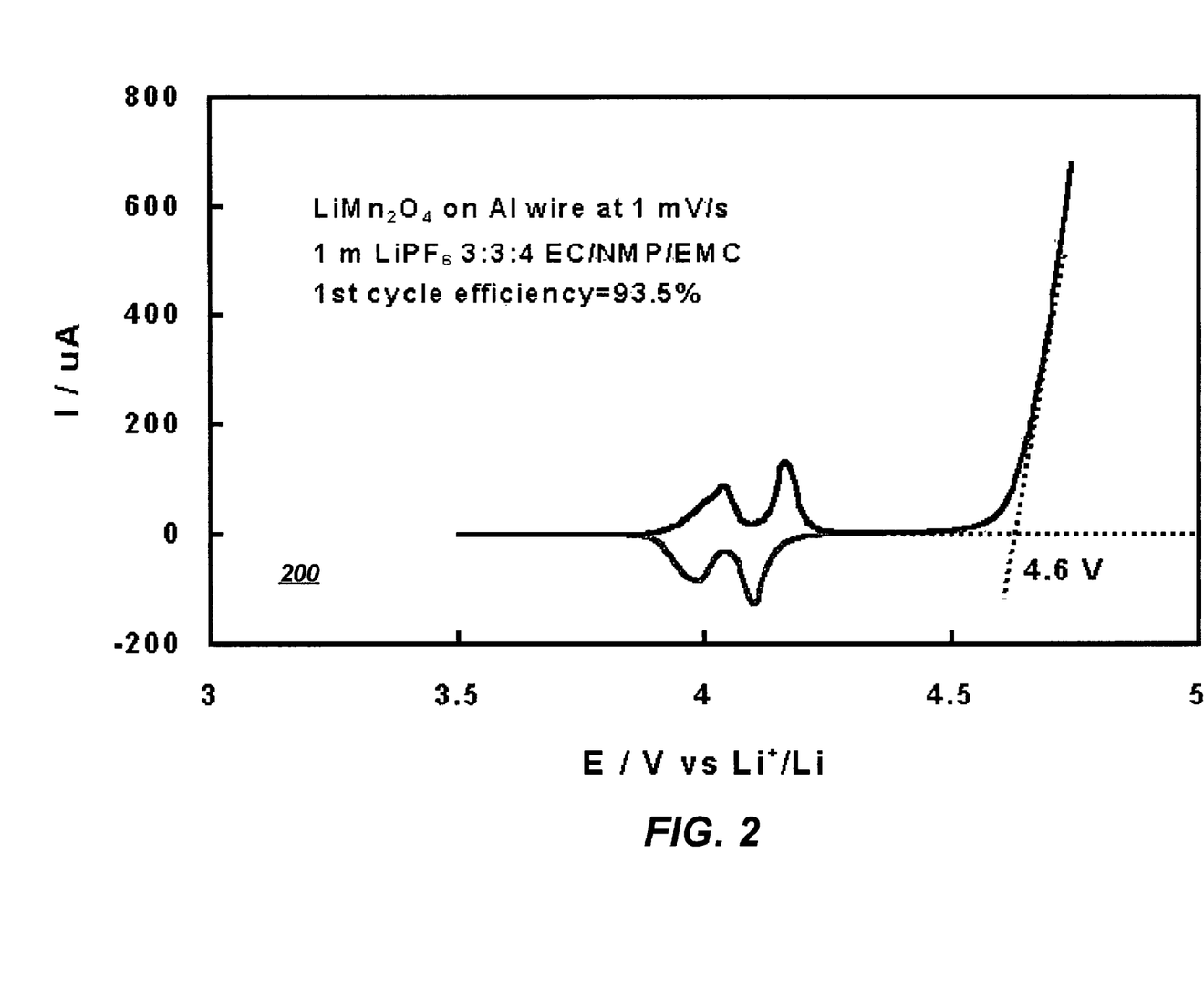
FIG. 2 illustrates a graph depicting the oxidative stability of an electrolyte system that includes the solvents of the present invention with respect to a cathode in accordance with a preferred embodiment of the present invention.

Stability of the electrolyte solution of Example I was further tested against a commonly known lithiated manganese spinel cathode material using cyclic voltammetry. FIG. 2 illustrates a graph 200 depicting the oxidative stability of an electrolyte system that includes the solvents of the present invention with respect to a cathode in accordance with a preferred embodiment of the present invention. As illustrated in FIG. 2, the major decomposition of the NMP-containing electrolytes start at potentials above 4.6 V, well above the range where reversible intercalation chemistry of Li-ion occurs. This result proves that the electrolyte of the present invention can operate with high stability utilizing a lithiated manganese spinel cathode.

EXAMPLE 4

Figure 3:
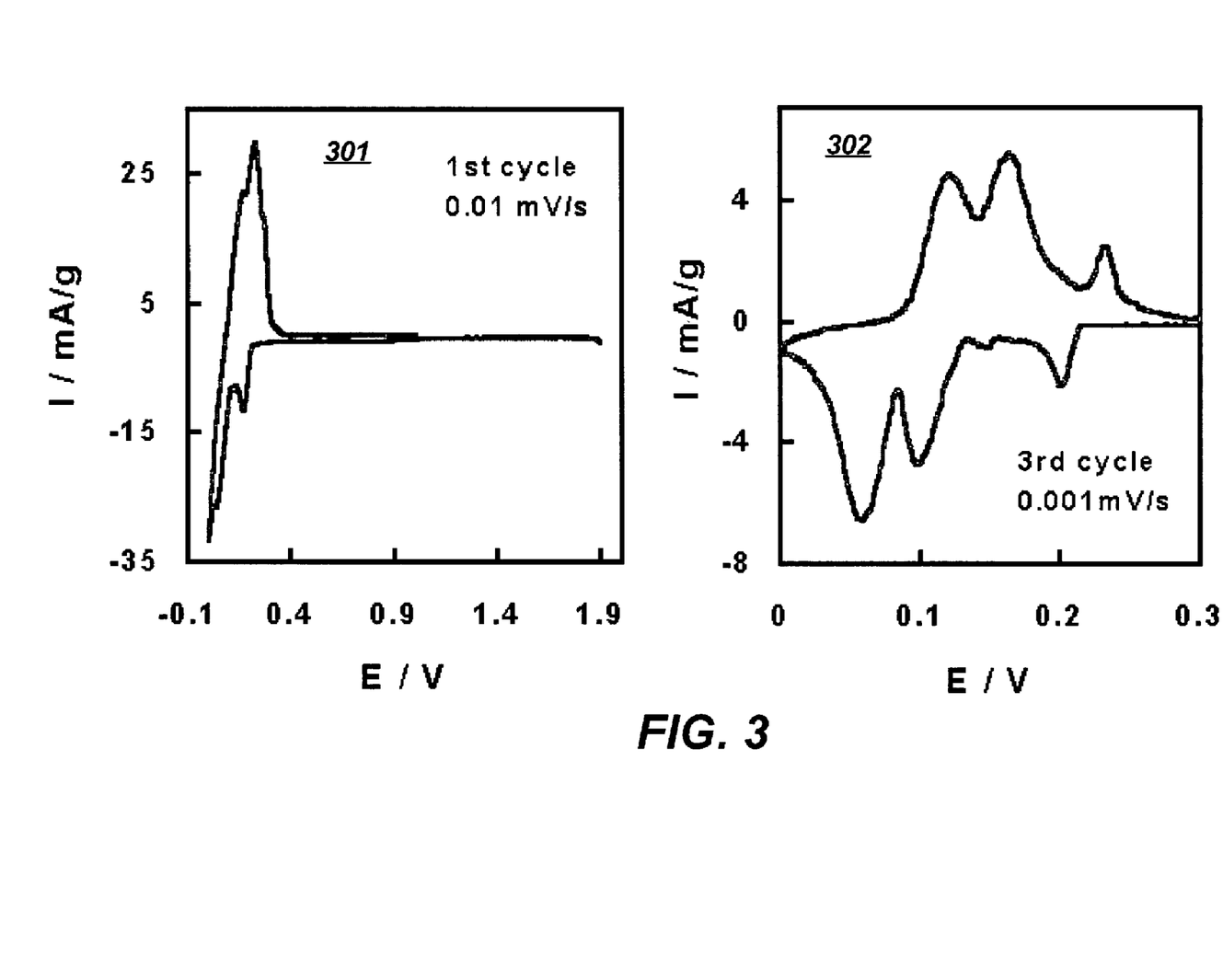
FIG. 3 depicts graphs illustrating the cycling of an anode composite coated on a Cu current collector in any electrolyte system comprising solvents of the present invention in accordance with a preferred embodiment of the present invention.

Stability of the electrolyte solution of Example I was further tested on the surface of a carbonaceous anode using cyclic voltammetry. FIG. 3 depicts graphs 301 and 302 illustrating the cycling of an anode composite coated on a Cu current collector in any electrolyte system comprising solvents of the present invention in accordance with a preferred embodiment of the present invention. Note that the cycling of the anode composition coated on the Cu current collector is illustrated utilizing a cyclic voltammogram for the 1$^{st}$ cycle at 0.01 mV/s as indicated at graph 301 and a cyclic voltammogram for the 3 cycle at 0.001 mV/s as indicated at graph 302. Also, as demonstrated by graphs 301 and 302 FIG. 3, no solvent decomposition of the NMP-containing electrolytes was detected while the reversible intercalation of Li-ion occurs. At a slower scan rate of 0.001 mV/s, distinctively resolved graphite intercalation stages appeared. This result proves that the electrolyte of the present invention can operate in a stable manner utilizing a carbonaceous anode

EXAMPLE 5

Figure 4:
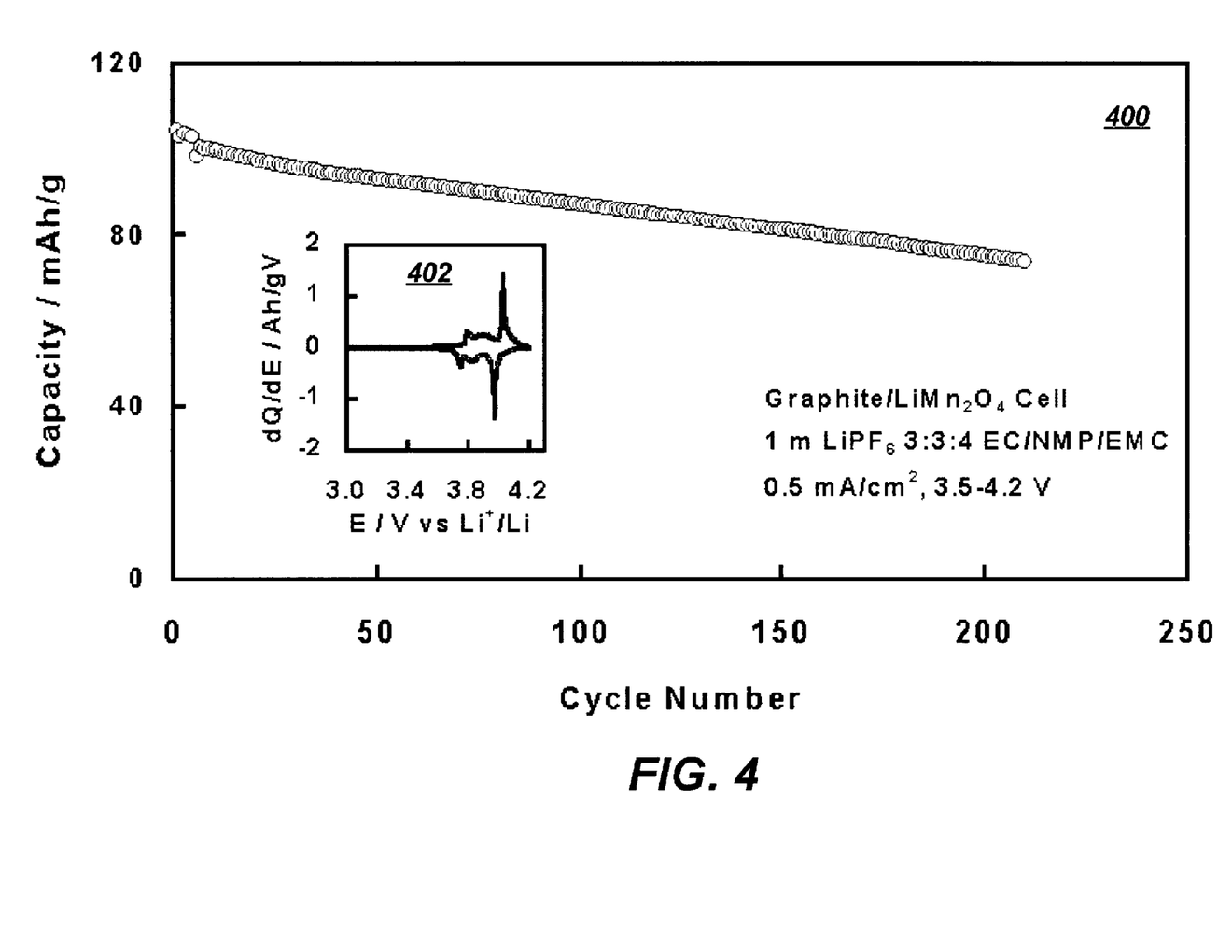
FIG. 4 illustrates a graph including an inset thereof depicting the discharge capacity of an Li-ion full cell utilizing graphite as an anode, lithiated spinel as a cathode and the electrolyte of the present invention in accordance with a preferred embodiment of the present invention.

The electrolyte solution (1.0 m LiPF$_6$ 3:3:4 EC/NMP/EMC) of Example I was incorporated in a full Li ion cell that uses the above cathode and anode to test its performance. FIG. 4 illustrates a graph 400 depicting the discharge capacity of an Li-ion full cell utilizing graphite as an anode, lithiated spinel as a cathode and the electrolyte of the present invention in accordance with a preferred embodiment of the present invention. Graph 400 includes an inset 402 that depicts differential capacity versus voltage at a 1$^{st}$ cycle In the life span of ca. 200 cycles the initial capacity of ca. 100 mAh/g was achieved, typical of a lithium manganese spinel composite. A structural degrading and Mn dissolution of the spinel cathode may cause the fading in capacity, which is a well-known instability of this cathode. The example depicted in graph 400 of FIG. 4 thus demonstrates that the electrolyte of the present invention can function well in an Li ion cell.

EXAMPLE 6

Figure 5:
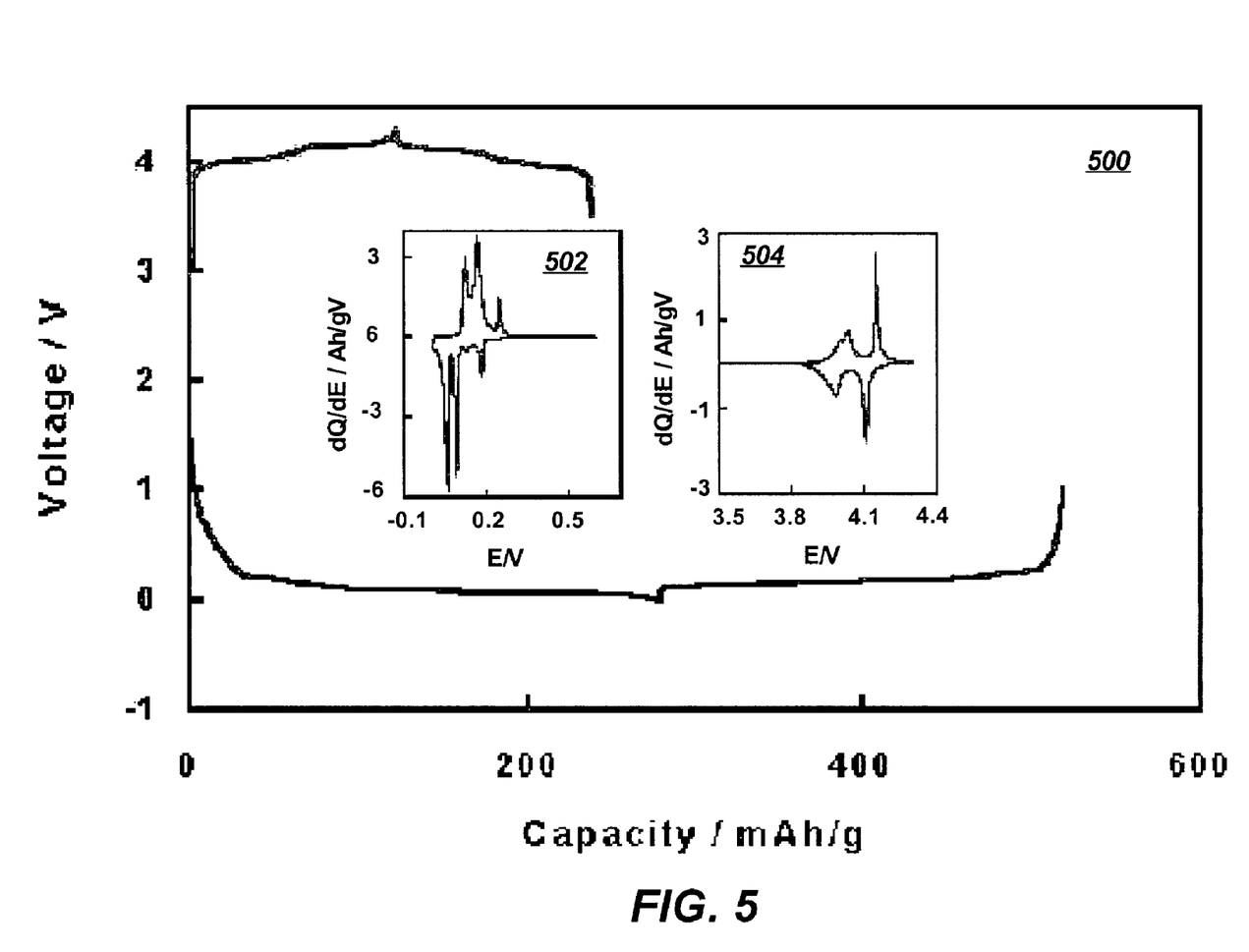
FIG. 5 depicts a graph including an inset thereof indicating voltage capacity curves of Li/anode and Li/cathode half-cells, and an electrolyte with $LiPF_6$ in accordance with a preferred embodiment of the present invention.
Figure 6:
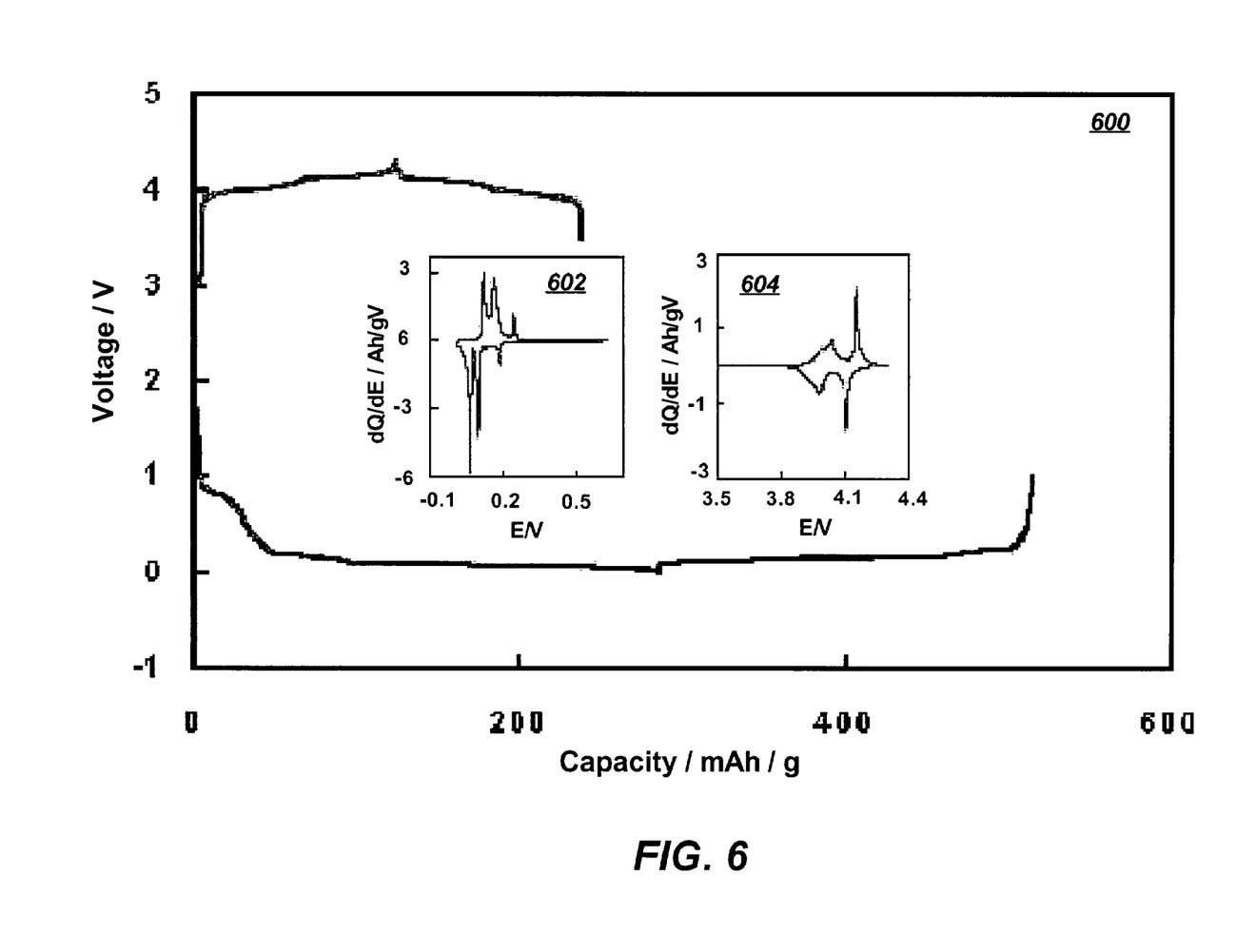
FIG. 6 illustrates a graph including insets thereof illustrating voltage-capacity curves of Li/anode and Li/cathode cells utilizing graphite as an anode and a lithium manganese spinel as a cathode, respectively, and an electrolyte with $LiBF_4$ as salt in accordance with a preferred embodiment of the present invention.

FIG. 5 depicts a graph 500 including insets 502 and 504 thereof indicating voltage capacity curves of Li/anode and Li/cathode half-cells, and an electrolyte with LiPF$_6$ in accordance with a preferred embodiment of the present invention. Note that the insets 502 and 504 illustrated in graph 500 of FIG. 5 illustrate the differential capacity versus cell voltage derived form constant current cyclings. FIG. 6 illustrates a graph 600 including insets 602 and 604 thereof illustrating voltage-capacity curves of Li/anode and Li/cathode cells utilizing graphite as an anode and a lithium manganese spinel as a cathode, respectively, and an electrolyte with LiPF$_6$ in accordance with a preferred embodiment of the present invention. The insets 602 and 604 of graph 600 of FIG. 6 illustrate the differential capacity versus cell voltage derived from constant current cyclings. The voltage profiles (as well as the differential capacity plots in the insets) of Li/graphite and Li/lithium manganese spinet half-cells utilizing an electrolyte solution of 1 m LiPF$_6$ in EC/NMP/EMC (3:3:4) and 1 m LiBF$_4$ in EC-NMP-EMC (3:3:4) are depicted FIGS. 5 and 6, respectively. High columbic efficiency obtained at both the graphite electrode and the lithium manganese spinel electrode indicate that Li-Ions cells perform well in electrolyte solvents of this invention with different Li salts such as LiPF$_6$ and LiBF$_4$.

EXAMPLE 7

Figure 7:
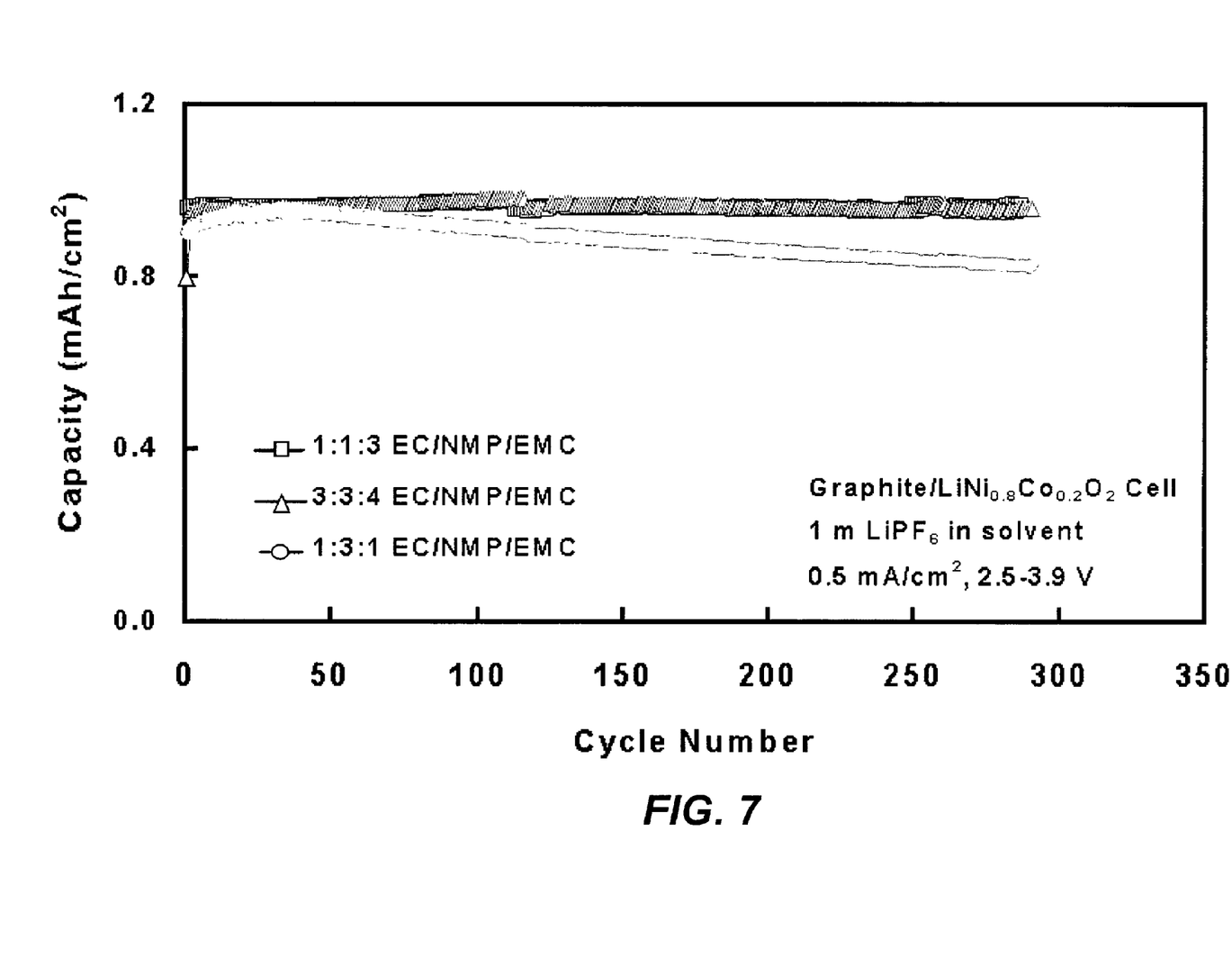
FIG. 7 depicts a graph indicating the cycling performance of a Li-ion cell utilizing graphite as an anode, lithiated nickel-cobalt oxide as a cathode using electrolytes of the present invention with $LiPF_6$ as salt in accordance with an alternative embodiment of the present invention.

FIG. 7 depicts a graph 700 indicating the cycling performance of an Li-ion cell utilizing graphite as an anode, lithiated nickel-cobalt oxide as a cathode electrolytes of the present invention without linear carbonate solvents, and an electrolyte with LiPF$_6$ in accordance with an alternative embodiment of the present invention Li-Ion cells were tested at room temperature in the electrolytes of 1.0 m LiPF$_6$ in the EC-NMP-EMC solvents of the following three compositions, 1:1:3, 3:3:4, and 1:3:1 in weight ratios. The results demonstrate that the cells obtained high capacity utilization and high capacity retention over 290 cycles via the electrolytes of the present invention.

EXAMPLE 8

Figure 8:
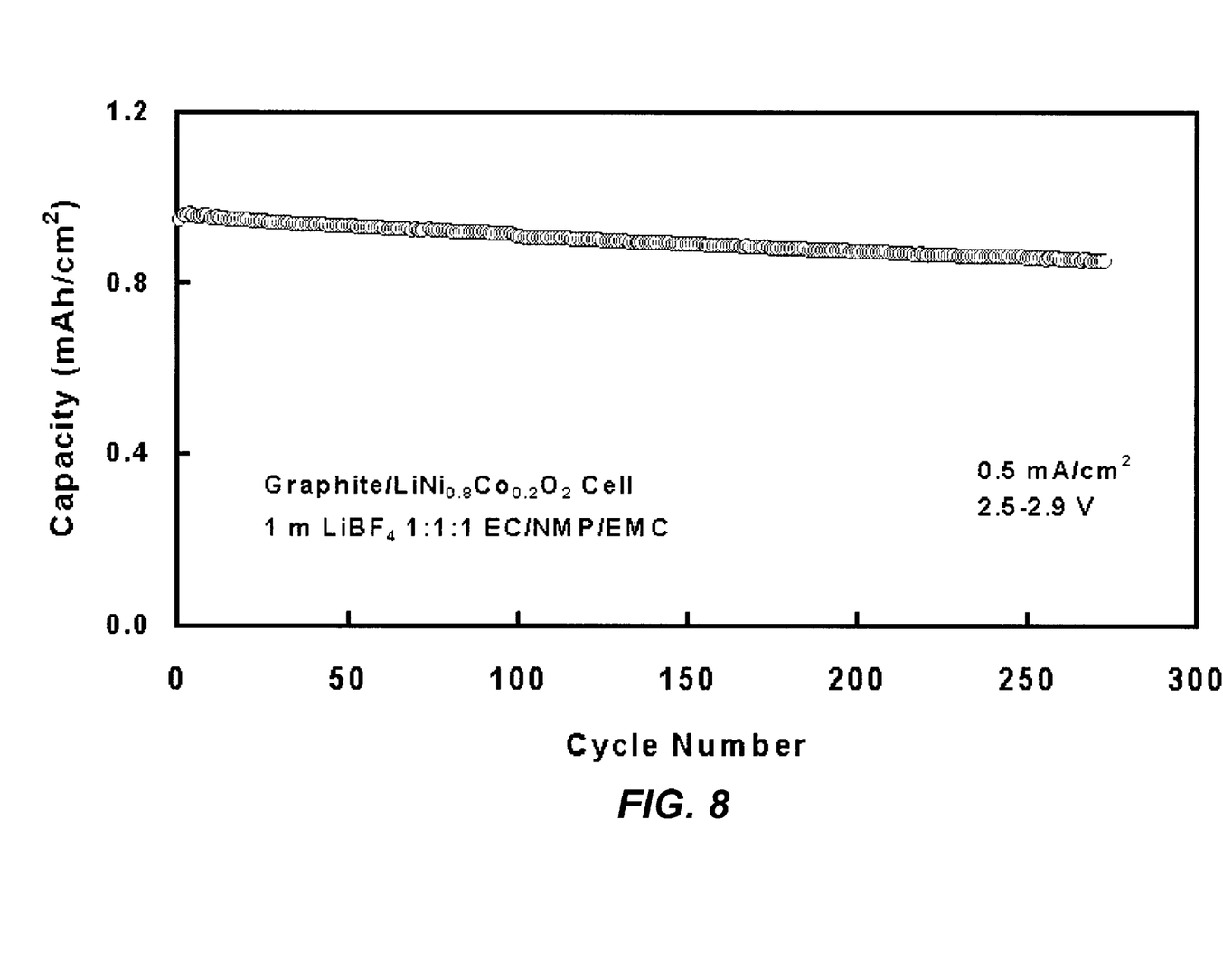
FIG. 8 illustrates a graph indicating the cycling performance of an Li-ion cell utilizing graphite as an anode, lithiated nickel-cobalt oxide as a cathode and electrolytes of the present invention with $LiBF_4$ as salt in accordance with an alternative embodiment of the present invention.

FIG. 8 illustrates a graph 800 indicating the cycling performance of an Li-ion cell utilizing graphite as an anode, lithiated nickel-cobalt oxide as a cathode and electrolytes of the present invention with linear carbonate solvents, in accordance with an alternative embodiment of the present invention. Li-Ion cells were tested at room temperature in the electrolytes of 1 m LiBF$_4$ in the EC-NMP-EMC (1:1:1) As shown in FIG. 8, the cell achieved high capacity utilization and high capacity retention over 273 cycles in the electrolyte of the present invention.

EXAMPLE 9

Figure 9:
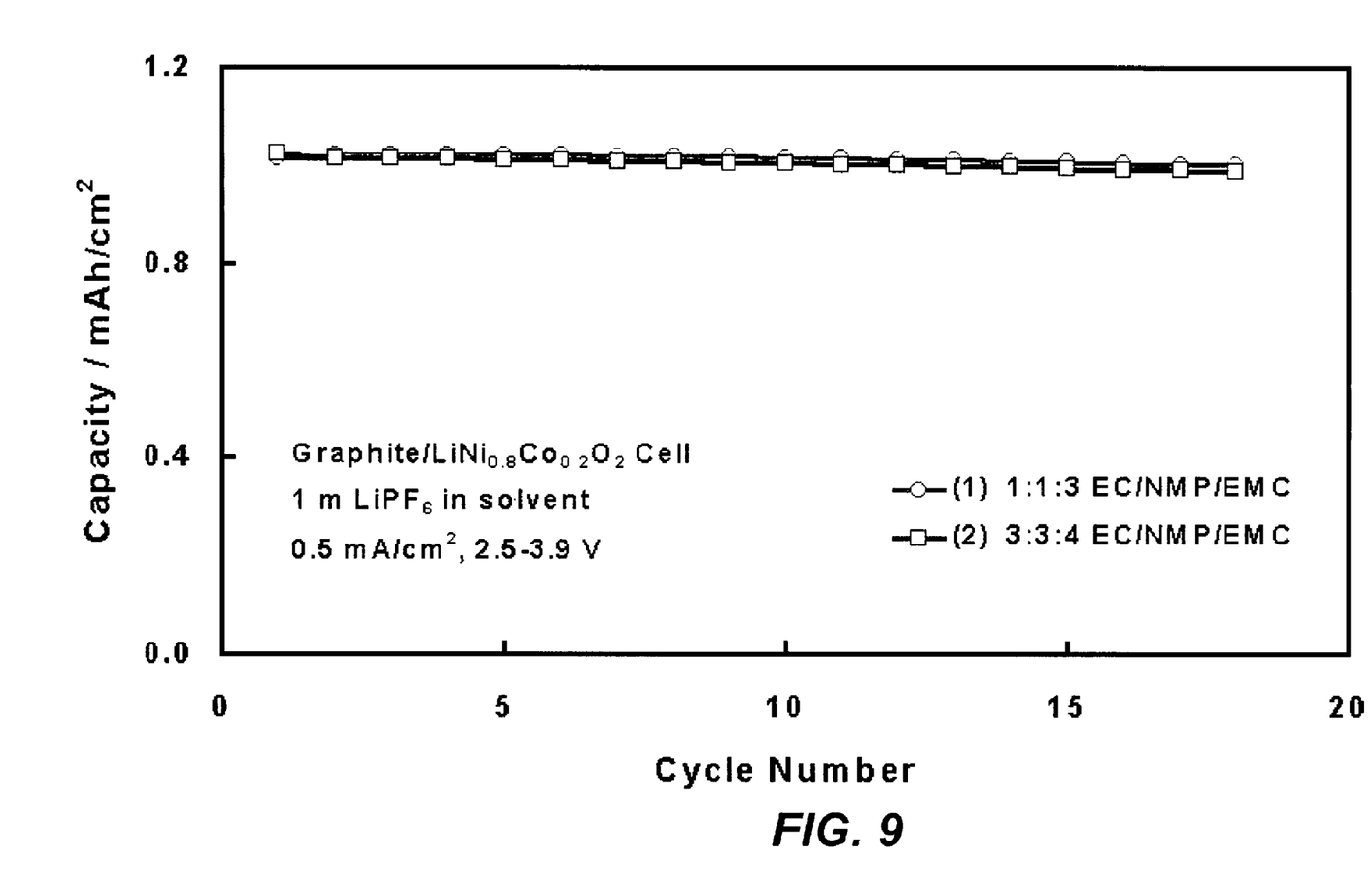
FIG. 9 depicts the cycling performance of a Li-ion cell utilizing graphite as an anode, lithiated nickel-cobalt oxide as a cathode and electrolytes of the present invention with $LiPF_6$ in accordance with a preferred embodiment of the present invention.

FIG. 9 depicts a graph 900 illustrating the cycling performance of an Li-ion cell utilizing graphite as an anode, lithiated nickel-cobalt oxide as a cathode and electrolytes of the present invention with LiBF$_4$ as a salt and an electrolyte with LiPF$_6$ in accordance with a preferred embodiment of the present invention. Li-ion cells were tested at 60° C. in the electrolytes of 1 m LiPF$_6$ in the EC-NMP-EMC solvents of the following two compositions, 1:1:3 and 3:3:4 in weight ratios. As shown in FIG. 9, the results indicate that the cells obtained high capacity utilization and high capacity retention at 60° C. via the electrolytes of the present invention As explained in the above examples, the present invention provide nonaqueous electrolytes for—secondary batteries with excellent characteristics in capacity utilization, capacity retention, and cycle life at wide temperature range notably at elevated temperatures.

Based on the foregoing, it can be appreciated that the present invention can be implemented as a system for providing a non-aqueous electrolyte solution for use with a lithium ion cell. Such a system generally includes an electrolyte salt dissolved in a solvent system. Such an electrolyte salt can be, for example, a lithium salt. Examples of lithium salts that can be implemented in accordance with the system of the present invention include $LiPF_6$ and $LiBF_4$. The solvent system can be implemented as a mixture of one or more cyclic esters, and/or one or more chain esters, and at least a lactam-based solvent (i.e., formed from a lactam), such that the lactam-based solvent possesses a general chemical structure as follows:

Thus, n represents a value ranging between 2 and 7, X comprises a linear or branched alkyl group of carbon numbers between 1 and 4. $R^1$ and $R^2$ may be identical or different to one another and can be formed from a linear or branched alkyl group of carbon numbers between 1 and 4, which are optionally, but not limited to one or more alkyl substituents, which can be substituted with one or more halogen atoms. The cyclic ester can be selected from a group consisting of ethylene carbonate, propylene carbonate, butylenes carbonate, and γ-butyrolactone. The chain ester can be selected from a group consisting of diethyl carbonate, dimethyl carbonate, ethyl methyl carbonate, ethyl formate, methyl formate, ethyl acetate, methyl acetate, ethyl butyrate, and methyl butyrate. The lactam itself can be selected from a group comprising at least one of the following. 1-methyl propiolactam, 1-methylpyrrolidinone, 1-methyl piperidone, 1-methyl caprrolactam, and 1-methyl azacyclononanone.

The lactam can possess a weight percentage of 2% to 90% based on a total weight of solvents associated with an electrolyte of said non-aqueous electrolyte solution. The lactam can alternatively possess a preferred weight percentage of 10% to 60% based on a total weight of solvents associated with an electrolyte of said non-aqueous electrolyte solution. The cyclic ester can comprise at least one of the following ethylene carbonate, propylene carbonate, butylenes carbonate, and γ-butyrolactone. The chain ester can comprise at least one of the following: dimethyl carbonate, ethylmethyl carbonate, diethyl carbonate, methylpropyl carbonate, methylisopropyl carbonate, ethyl formate, methyl formate, ethyl acetate, methyl acetate, ethyl butyrate, and methyl butyrate The electrolyte salt can be formed to include a content of electrolyte salt in a range of 0 2 mol/liter to 2.0 mol/liter. Such a system can be configured in the context of a non-aqueous electrochemical cell that includes said non-aqueous electrolyte solution. Such a non-aqueous electrochemical cell generally includes a negative electrode active material selected from a group consisting of lithium metal, lithium alloys, and carbonaceous materials intercalated and de-intercalated with lithium ions, along with a positive electrode active material comprising at least one lithiated transition metal oxide.

Several advantages can be derived from using lactam or a solvent based on a lactam as a key solvent component mixed with one or more cyclic esters and one or more chain esters in non-aqueous electrolytes for Li-ion batteries. Li-ion cells with graphite anodes do not perform well in PC-based solvent systems when PC content is over 25% using either $LiPF_6$ or $LiBF_4$ salt Furthermore, Li-ion cells with graphite anodes perform well in EC-based solvent systems utilizing $LiPF_6$ salt, but not in solvent systems, which utilize $LiBF_4$ salt. Li cells, however, with a graphite anode can perform better in an electrolyte with either $LiPF_6$ or $LiBF_4$ salt in a solvent mixture composed of a pyrrolidinone solvent and esters than a solvent mixture that is formed from only esters.

State-of-the art Li-ion cells demonstrate discharge capacity fading at temperatures over 60° C. A highly stable and conductive SEI ("Solid Electrolyte Interface") layer can be performed when pyrrolidinone solvent is utilized in addition to a mixture of one or more cyclic esters and one or more chain esters. This improves the cyclic life, storage life, and charge retention at elevated temperatures of the Li-ion cells.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The invention claimed is:

1. A non-aqueous electrolyte solution for use with a lithium ion battery having an anode, a cathode, and a non-aqueous electrolyte solution consisting of an electrolyte salt and an electrolyte solvent, the electrolyte solution consisting of:

$LiPF_6$ dissolved in an electrolyte solvent consisting of a mixture of ethylene carbonate, ethyl methyl carbonate, and 1-methyl pyrrolidinone.

2. A non-aqueous electrolyte solution for use with a lithium ion battery having an anode, a cathode, and a non-aqueous electrolyte solution of an electrolyte salt and an electrolyte solvent, the electrolyte solution comprising:

$LiPF_6$ dissolved in an electrolyte solvent comprising a mixture of ethylene carbonate, ethyl methyl carbonate, and 1-methyl propiolactam.

3. A non-aqueous electrolyte solution for use with a lithium ion battery having an anode, a cathode, and a non-aqueous electrolyte solution of an electrolyte salt and an electrolyte solvent, the electrolyte solution comprising:

$LiPF_6$ dissolved in an electrolyte solvent comprising a mixture of ethylene carbonate, ethyl methyl carbonate, and 1-methyl piperidone.

4. A non-aqueous electrolyte solution for use with a lithium ion battery having an anode, a cathode, and a non-aqueous electrolyte solution of an electrolyte salt and an electrolyte solvent, the electrolyte solution comprising:

LiPF$_6$ dissolved in an electrolyte solvent comprising a mixture of ethylene carbonate, ethyl methyl carbonate, and 1-methyl caprolactain.

5. A non-aqueous electrolyte solution for use with a lithium ion battery having an anode, a cathode, and a non-aqueous electrolyte solution of an electrolyte salt and an electrolyte solvent, the electrolyte solution comprising:

LiPF$_6$ dissolved in an electrolyte solvent comprising a mixture of ethylene carbonate, ethyl methyl carbonate, and 1-methyl azacyclononanone.

* * * * *